United States Patent [19]

Chang

[11] Patent Number: 5,013,908
[45] Date of Patent: May 7, 1991

[54] BREAK DETECTION SYSTEM USING OPTICAL FIBERS HAVING UNIQUE FREQUENCY MODULATED LIGHT

[75] Inventor: James Chang, Colorado Springs, Colo.

[73] Assignee: Kaman Sciences Corporation, Colorado Springs, Colo.

[21] Appl. No.: 276,629

[22] Filed: Nov. 28, 1988

[51] Int. Cl.⁵ .............................................. G08B 13/12
[52] U.S. Cl. ................................ 250/227.15; 340/550
[58] Field of Search ............... 250/227, 227.15, 227.21; 455/610, 612, 608, 619; 356/73.1; 370/3; 340/555, 556, 550

[56] References Cited

U.S. PATENT DOCUMENTS

| | | | |
|---|---|---|---|
| 2,944,250 | 7/1960 | Outt | 73/432.1 |
| 3,519,116 | 7/1970 | Koehn | 400/77 |
| 3,758,780 | 9/1973 | Lee | 250/221 |
| 4,144,530 | 3/1979 | Redfern | 340/566 |
| 4,272,189 | 6/1981 | Bailey et al. | 356/28 |
| 4,362,358 | 12/1982 | Hafle | 350/96.16 |
| 4,399,430 | 8/1983 | Kitchen | 340/550 |
| 4,446,366 | 5/1984 | Bregardh et al. | 250/227 |
| 4,450,434 | 5/1984 | Nielsen et al. | 340/506 |
| 4,581,274 | 4/1986 | Crane | 250/227 |
| 4,609,816 | 9/1986 | Severin | 250/227 |
| 4,653,916 | 3/1987 | Henning et al. | 356/345 |
| 4,772,092 | 9/1988 | Hofer et al. | 350/96.24 |
| 4,808,814 | 2/1989 | Hofer et al. | 250/227 |

Primary Examiner—David C. Nelms
Assistant Examiner—George Beck
Attorney, Agent, or Firm—Fishman, Dionne & Cantor

[57] ABSTRACT

A fiber optic detection system comprising an array of fiber optic elements is presented. Each fiber optic element is uniquely encoded using a plurality of discrete ferquencies, digital codes or other encoding techniques. When a break occurs in one or more fiber optic elements, the missing light frequencies or digital codes are sensed, thereby indicating the break. Preferably, the fiber optic elements are arranged in a grid pattern so that precise location of the break can be made.

19 Claims, 1 Drawing Sheet

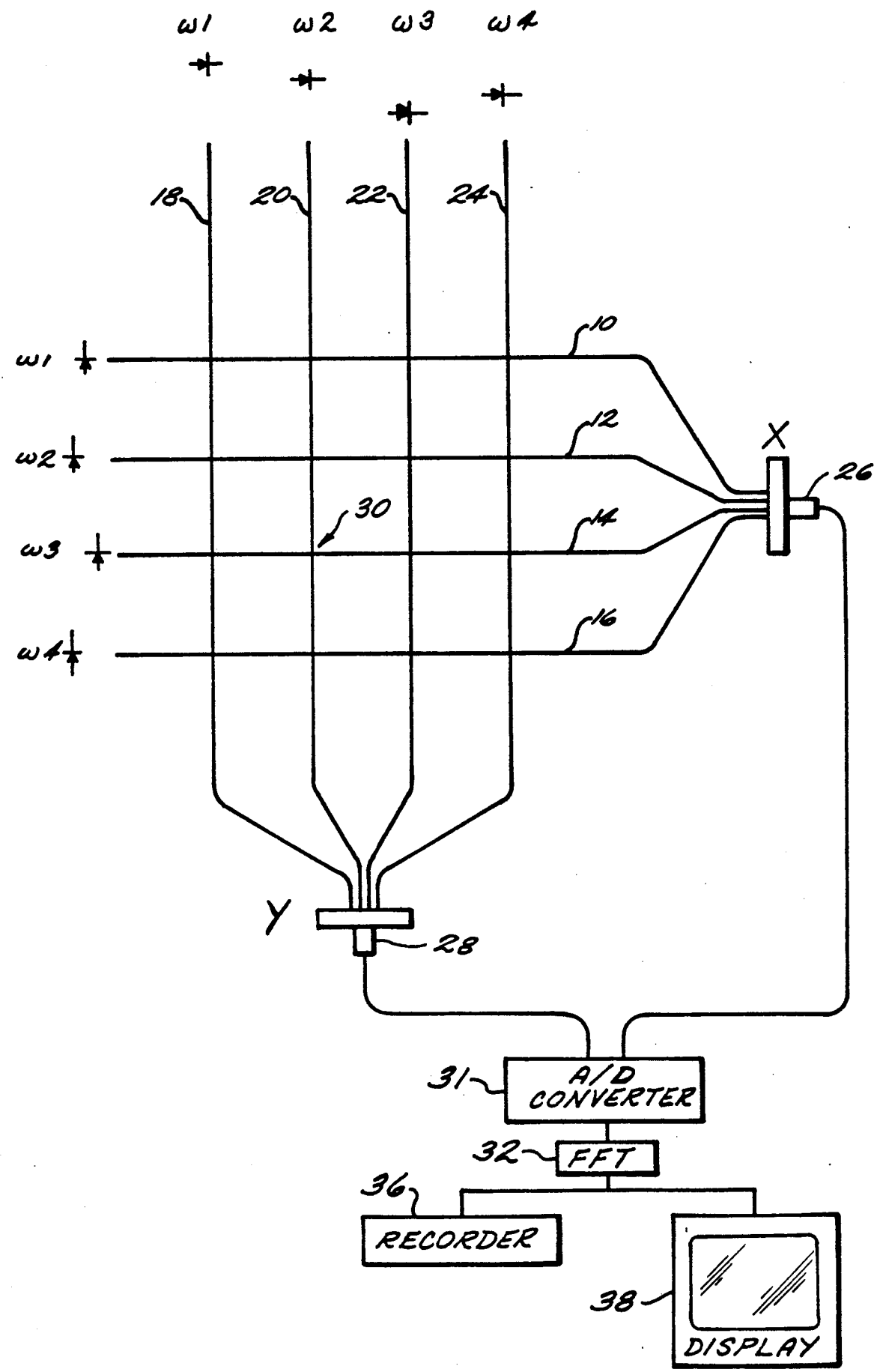

BREAK DETECTION SYSTEM USING OPTICAL FIBERS HAVING UNIQUE FREQUENCY MODULATED LIGHT

BACKGROUND OF THE INVENTION

This invention generally relates to a detection system using fiber optics. More particularly, this invention relates to a detection system using a plurality of fiber optic elements wherein each fiber optic element has a light input thereto having a unique frequency or digital code. When a break occurs in one or more fiber optic elements, the missing light frequencies or digital codes are sensed, thereby indicating the break. This invention is particularly well suited for use in grid configurations wherein precise location of the breaks can be made.

There is a great need for detections systems which detect certain events in remote or inaccessible environments. These environments may be remote because they pose a health hazard or because they are inaccessible so that direct assessment of the event is impossible. For example, there is a need to monitor and detect events such as leakage or breakage in hazardous waste containment and disposal systems; as well as nuclear (e.g. radioactive) environments. Similarly, in many remote impact experiments and tests, a direct assessment of the damage test results is impossible. Thus, a system is needed to provide real-time impact information. An illustrative example of such a test would be an intercept test involving a rocket launched warhead intercepting a reentry vehicle at high altitude. It will be appreciated that under experimental conditions there is a need to place a hit-indicator system on board the reentry vehicle to monitor the effectiveness of the interceptor.

Still another example of important applications for remote detection systems is in security systems. Security systems often include a security fence or the like installed along a perimeter or a boundary. In the event of a breach of the security system, the fact of the breach is signaled by an alarm. With the present invention, the location of the breach may also be immediately known.

There are known systems for detecting certain events in remote environments which utilize a plurality of fiber optic elements as an integral component thereof. Such known systems are disclosed in U.S. Pat. Nos. 4,399,430; 4,450,434; and 4,581,527.

U.S. Pat. No. 4,581,527 discloses a grid or array of optical fibers in a series of layers for locating and assessing damage in a structure (e.g. plastic composite structure). Light from a single light source is inputted through the fibers in a planar array, and an optoelectronic viewing device analyzes the fiber output from that planar array. In the event of damage to the structure, broken fibers will not carry light. The location of the damaged area (e.g. broken fibers) in two dimensions in any given plane is determined from those fibers having dark outputs. An LED may be used as the light source. The damage in three dimensions may be determined by performing the two dimensional analysis in the several layers.

U.S. Pat. No. 4,399,430 describes a security system incorporating a mesh-like array of fiber optic elements. When an element is broken, light will cease passing therethrough which will trigger an alarm. However, there is no disclosure of means for determining the location of the broken element(s). U.S. Pat. No. 4,450,434 describes a security device which is similar to the device of U.S. Pat. No. 4,399,430, however it does provide means for determining the location of the break. This is accomplished by using time domain reflectometry (TDR) techniques which measures the time it takes for a train of pulses to travel to the break in the fiber optic element and then be reflected back.

Notwithstanding the above-described prior fiber optic detection systems, there is a continuing need for improved fiber optic detection systems which will provide accurate information about the location and time of a break, and which are more reliable, simpler in design and more cost effective to manufacture and operate than the prior art.

SUMMARY OF THE INVENTION

In accordance with the present invention, a fiber optic detection system comprising a plurality of fiber optic elements is provided. Each fiber optic element has uniquely encoded light for the input thereto. This unique encoding technique may comprise providing each fiber optic element with a plurality of discrete light frequencies, digital codes or other encoding techniques. All of the fiber elements terminate at a single sensor or a plurality of sensors which collect the light output to determine which frequencies, digital codes or the like are present and which have been lost. A frequency or digital code which is not present indicates that a break in that particular fiber element has occurred.

In a preferred embodiment, the light is encoded using a plurality of unique frequencies. In this preferred embodiment, the light sensor may collect the total light output and use a known Fast Fourier Transform to separate the collected light into its discrete frequencies. Alternatively, the light sensor may look individually at each optical fiber sequentially in an effort to ascertain which fibers have been broken.

Also in a preferred embodiment, the plurality of fiber optic elements are arranged in an X-Y array or grid with the differing frequency modulated light being provided by a plurality of light emitting diodes (LED). The grid may be two dimensional (i.e., a surface grid), or it may be three dimensional (a volume grid). In this preferred embodiment, each fiber element in the X array has light input thereto from an LED having a unique modulating frequency; and modulated light with unique frequencies are also inputted to the fiber optic elements in the Y array. The light passed through the fibers in the X and Y grid are respectively collected in single or multiple X and Y photodiodes and analyzed. When a break occurs somewhere in the fiber optic grid, the light with a particular modulating frequency passing therethrough will be disrupted. The position of the disruption in the grid will be known because of the different modulating frequencies passing through each fiber optic element. Hence, the combined effect of grid arrangement and uniquely coded fibers makes it possible to determine the precise location of the fiber breaks, and hence the location of damage or break in a system.

An important feature of the present invention is the use of a plurality of distinct modulating frequencies or digital codes of light being fed to an array (preferably X-Y grid) of fiber optic elements. The feature provides certain advantages in terms of accuracy, reliability and simplicity in design relative to prior art fiber optic detection systems.

The above discussed and other features and advantages of the present invention will be appreciated and understood by those of ordinary skill in the art from the following detailed description and drawings.

BRIEF DESCRIPTION OF THE DRAWINGS

Referring now to the single FIGURE, a schematic of a fiber optic detection system in accordance with the present invention is shown.

DESCRIPTION OF THE PREFERRED EMBODIMENT

Referring now to the FIGURE, a fiber optic detection system in accordance with the preferred embodiment of the present invention is schematically shown. In the illustrated embodiment, the present invention is comprised of a 4×4 grid of optical fibers including four horizontal or X direction elements 10, 12, 14 and 16 and four vertical or Y direction elements 18, 20, 22 and 24. Positioned at the input end of each fiber optic element is a light emitting diode (LED) which will be coupled into a respective fiber optic element in a known and conventional manner. The output ends of all the X direction fiber optic elements 10, 12, 14 and 16 are all gathered into a first photodiode 26. Similarly, the output ends of all the Y direction fiber optic elements 18, 20, 22 and 24 are all gathered into a second photodiode 28. The X-Y grid may be two dimensional or three dimensional. If it is three dimensional, the LED inputs in each successive layer must be of different frequencies than the frequency inputs in all other layers. All X and Y outputs may still be gathered into a first and second photodiodes 26 and 28.

An important feature of the present invention is the use of a novel encoding technique that permits a high degree of multiplexing, unique fiber identification and a high degree of immunity to external noise and other forms of interference. In a preferred embodiment, this encoding technique calls for each LED to be modulated by a sine function with a unique frequency. For example, in the FIGURE, each fiber optic element is assigned a frequency ranging from $\omega_1$ to $\omega_4$. Thus, the X direction fiber optic elements 10, 12, 14 and 16 are respectively assigned a unique frequency $\omega 1_x$, $\omega 2_x$, $\omega 3_x$, and $\omega 4_x$. Similarly, the Y direction fiber optic elements 18, 20, 22 and 24 are respectively assigned corresponding unique frequencies $\omega 1_y$, $\omega 2_y$, $\omega 3_y$, and $\omega 4_y$. Each of $\omega 1_x$, $\omega 2_x$ etc. may be the same as each of the respective $\omega 1_y$, $\omega 2_y$. Alternatively, the Y direction fiber elements may be assigned a distinct set of frequencies which differ from those assigned to the X direction fiber elements (e.g. $\omega_5$, $\omega_6$, $\omega_7$ and $\omega_8$).

The X-Y photodiodes 26 and 28 may be of a known structure which receives and interrogates the light outputs of all of the fibers terminating thereto at the same time. The photodiodes then generate electrical outputs which are commensurate with the several light inputs. The output signals from photodiodes are then digitized (such as by an analog to digital converter 31) and are then put through a fast Fourier Transform in appropriately programmed microprocessor or computer 32 to provide discrete outputs which are commensurate with the several original individual discreet input light frequencies $\omega 1_x$, $\omega 2_x - \omega 3_y$, $\omega 4_y$. As a result, signals are generated corresponding to those frequencies ($\omega_x$ and $\omega_y$ signals) which are present and which have been lost. Alternatively, photodiodes 26 and 28 may be of the type which interrogate each fiber sequentially to determine which frequency is present and which has been lost.

The fiber optic detection system of the present invention as shown in the FIGURE operates as follows. When one or more fiber elements are broken, the particular frequency (or frequencies) of encoded light in that fiber or fibers will be disrupted and will be missing as input to the photodiode. The frequencies which are present will be detected and recorded. Those frequencies which are not present will be known by their absence. Alternatively, by multiplexing, the missing signals can be detected and recorded. Because each fiber is encoded with a unique frequency, the precise location of the break can be reconstructed by identifying the X and Y elements broken. For example, if the X photodiode 26 indicates that the light frequency $\omega_3$ is missing and the Y photodiode indicates that the light frequency $\omega_2$ is missing, then it is clear that a break in the fiber optic grid pattern has occurred in the area of the intersection of fiber optic elements 14 and 20 which has been identified by the numeral 30. The information derived by photodiodes 26 and 28 can be sent to any suitable recording or viewing means such as those schematically identified at 36 and 38.

It will be appreciated that other known parameters may be used as the means of uniquely encoding the light input to each fiber optic element. For example, rather than using unique frequencies, it will be appreciated that the LED may be modulated to provide a plurality of unique signals, such as by digital encoding. In this arrangement, each fiber optic element is identified by a unique encoded word.

While the present invention has been described in conjunction with the use thereof in an X-Y grid, it will be appreciated that the present invention is equally suitable without a grid or with a grid having a multitude of axes in addition to the X-Y axes. The use of the present invention without a grid would comprise a plurality of fiber optic elements all having light input thereto with unique encoding. In this non-grid case, precise location of breaks in the fiber optic elements would be difficult. However, the fact that a break has occurred would be clearly and easily evident.

The fiber optic detection system of the present invention provides many features and advantages relative to other detection systems and relative to prior art fiber optic systems. For example, the present invention is lightweight and compact and is immune to RF interference. The present invention can also be embedded into structures of any form and shape. The unique encoding feature of the present invention provides an efficient technique for indicating the occurrence and location of a break in the system. The present invention is suitable for digital or analog data recording, includes multiple break indication capability and has high time resolution.

The present invention is also well suited for a large number of differing applications. For example, an optical fiber network grid such as shown in the FIGURE can be embedded in the heat shield of a reentry vehicle to detect any penetration by an interceptor. Thus, when the interceptor or projectile hits the fiber optic net, it will break a number of fiber elements and the particular frequency encoded light in these fibers will be disrupted and will be missing as input to the photodiode. The absence will be detected and recorded. Because each fiber is encoded with the unique frequency, the precise location of the impact can be reconstructed by identifying the X and Y elements broken. As mentioned, in this particular application, the present invention will also allow for multiple hit indication capability.

Still another application of the present invention is the use thereof in environments which pose a health hazard. For example, the fiber optic network of the present invention could be embedded in hazardous waste containment and disposal systems or those systems employing radioactive materials. In the event of leakage or breakage, the occurrence and location of the leakage or breakage will be detected in the manner described above setting off appropriate alarms and permitting cleanup. Still another application of fiber optic detection system of the present invention is the use thereof in security fences and the like wherein the location and occurrence of a break in the security fence could be immediately known. These applications are similar to the applications of prior fiber optic detection networks described in the above discussed U.S. Pat. Nos. 4,399,430 and 4,450,434.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Fiber optic detection system comprising:
   a plurality of fiber optic elements, each element having an input end and an output end;
   light inputting means for inputting modulated encoded light to each of said input ends of said fiber optic elements wherein each fiber optic element receives a light code having a unique modulated frequency so that each fiber optic element will be assigned a different pre-selected frequency;
   light detecting means for interrogating the output ends of said fiber optic elements wherein the absence of one or more unique light codes indicates a break in at least one of said fiber optic elements.

2. The system of claim 1 wherein:
   said light inputting means comprises a light emitting diode coupled to the input ends of each fiber optic element.

3. The system of claim 1 wherein:
   said light detecting means comprises photodiode means.

4. The system of claim 1 wherein:
   said output ends of all of said plurality of fiber optic elements terminate at photodiode means.

5. The system of claim 3 wherein:
   said output ends of all of said plurality of fiber optic elements terminate at said photodiode means.

6. The system of claim 1 including:
   fast fourier transformer means for separating said light detected by said photodiode means into said preselected frequencies.

7. A method of detection using a fiber optic detection system including a plurality of fiber optic elements, each element having an input end and an output end, comprising the steps of:
   inputting modulated encoded light to each of said input ends of said fiber optic elements wherein each fiber optic element receives a light code having a unique modulated frequency so that each fiber optic element will be assigned a different pre-selected frequency; and
   interrogating the output ends of said fiber optic elements wherein the presence and absence of one or more of said unique light codes is detected and wherein the absence of one or more of said unique light codes indicates a break in at least one of said fiber optic elements.

8. The method of claim 1 wherein:
   said light inputting step is accomplished using a light emitting diode coupled to the input ends of each fiber optic element.

9. Fiber optic detection system comprising:
   a plurality of fiber optic elements, each element having an input end and an output end, said plurality of fiber optic elements being arranged in a grid configuration defining an array of X fiber optic elements and an array of Y fiber optic elements;
   light inputting means for inputting modulated encoded light to each of said input ends of said fiber optic elements wherein each fiber optic element in said X array receives a light code having a unique modulated frequency so that each fiber optic element in said X array will be assigned a different pre-selected frequency and each fiber optic element in said Y array receives a light code having a unique modulated frequency so that each fiber optic element in said Y array will be assigned a different pre-selected frequency;
   light detecting means for interrogating the output ends of said fiber optic elements in said X and Y arrays wherein the absence of one or more of said unique light codes indicates a break in at least one of said fiber optic elements.

10. The system of claim 9 wherein:
    said light inputting means comprises a light emitting diode coupled to the input ends of each fiber optic element.

11. The system of claim 9 wherein:
    said preselected frequencies in said X array respectively correspond to said preselected frequencies in said Y array.

12. The system of claim 9 wherein:
    said light detecting means comprises first photodiode means for detecting light from said X array and second photodiode means for detecting light from said Y array.

13. The system of claim 9 wherein:
    said output ends of all of said X array fiber optic elements terminate at first photodiode means and said output ends of all of said Y array fiber optic elements terminate at second photodiode means.

14. The system of claim 12 wherein:
    said output ends of all of said X array fiber optic elements terminate at first photodiode means and said output ends of all of said Y array fiber optic elements terminate at second photodiode means.

15. The system of claim 14 including:
    fast fourier transformer means for separating said light detected by said first and second photodiode means into said preselected frequencies.

16. A method of detection using a fiber optic detection system including a plurality of fiber optic elements arranged in a grid configuration defining an array of X fiber optic elements and an array of Y fiber optic elements, each element having an input end and an output end, comprising the steps of:
    inputting modulated encoded light to each of said input ends of said fiber optic elements in said X array wherein each fiber optic element in said X array receives a light code having a unique modulated frequency so that each fiber optic element in said X array will be assigned a different pre-selected frequency;

inputting modulated encoded light to each of said input ends of said fiber optic elements in said Y array wherein each fiber optic element in said Y array receives a light code having a unique modulated frequency so that each fiber optic element in said Y array will be assigned a different preselected frequency;

interrogating the output ends of said fiber optic elements in said X array wherein the presence and absence of one or more of said unique light codes is detected and wherein the absence of one or more of said unique light codes indicates a break in at least one of said fiber optic elements in said X array; and interrogating the output ends of said fiber optic elements in said Y array wherein the presence and absence of one or more of said unique light codes is detected and wherein the absence of one or more of said unique light codes indicates a break in at least one of said fiber optic elements in said Y array.

17. The method of claim 16 wherein:
said light inputting step is accomplished using a light emitting diode coupled to the input ends of each fiber optic element.

18. The system of claim 16 wherein:
said preselected frequencies in said X array respectively correspond to said preselected frequencies in said Y array.

19. Fiber optic detection system comprising:
a plurality of fiber optic elements, each element having an input end and an output end, said plurality of fiber optic elements being arranged in a grid configuration defining an array of X fiber optic elements and an array of Y fiber optic elements;

light inputting means for inputting encoded light to each of said input ends of said fiber optic elements wherein each fiber optic element in said X array receives a unique light code and each fiber optic element in said Y array receives a unique light code;

light detecting means for interrogating the output ends of said fiber optic elements in said X and Y arrays wherein the absence of one or more unique light codes indicates a break in at least one of said fiber optic elements said light detecting means comprising first photodiode means for detecting light from said X array and second photodiode means for detecting light from said Y array with said output ends of all of said X array fiber optic elements terminating at said first photodiode means and said output ends of all of said Y array fiber optic elements terminating at said second photodiode means;

said unique light code comprising a unique frequency wherein each fiber optic element in said X array is assigned encoded light having a different preselected frequency and each fiber optic element in said Y array is assigned encoded light having a different preselected frequency; and fast fourier transformer means for separating said light detected by said first and second photodiode means into said preselected frequencies.

* * * * *

UNITED STATES PATENT AND TRADEMARK OFFICE
CERTIFICATE OF CORRECTION

PATENT NO. : 5,013,908
DATED : May 7, 1991
INVENTOR(S) : James Chang

It is certified that error appears in the above-indentified patent and that said Letters Patent is hereby corrected as shown below:

On the title page, Item [57]: Abstract, line 4, delete "frequencies" and insert therefor —-frequencies—-.

Col. 3, line 59, Insert —-an—- after "in".

Col. 4, line 8, Delete "bY" and insert therefor —-by—-.

Col. 6, line 3, Delete "claim 1" and insert therefor —-claim 7—-.

Signed and Sealed this

Twenty-third Day of November, 1993

Attest:

BRUCE LEHMAN

Attesting Officer

Commissioner of Patents and Trademarks